(12) United States Patent
Maguin

(10) Patent No.: US 9,879,582 B2
(45) Date of Patent: Jan. 30, 2018

(54) METHOD FOR STARTING THE OPERATION OF A DEVICE FOR PROVIDING A LIQUID ADDITIVE

(71) Applicant: CONTINENTAL AUTOMOTIVE GMBH, Hannover (DE)

(72) Inventor: Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/772,676

(22) PCT Filed: Feb. 25, 2014

(86) PCT No.: PCT/EP2014/053617
§ 371 (c)(1),
(2) Date: Sep. 3, 2015

(87) PCT Pub. No.: WO2014/135399
PCT Pub. Date: Sep. 12, 2014

(65) Prior Publication Data
US 2016/0017782 A1      Jan. 21, 2016

(30) Foreign Application Priority Data

Mar. 4, 2013   (DE) .................. 10 2013 102 101

(51) Int. Cl.
*F01N 3/20* (2006.01)
(52) U.S. Cl.
CPC ......... *F01N 3/2013* (2013.01); *F01N 3/2066* (2013.01); *F01N 2240/16* (2013.01);
(Continued)

(58) Field of Classification Search
CPC ... F01N 3/26; F01N 3/38; F01N 3/025; F01N 3/027; F02B 3/06
(Continued)

(56) References Cited

U.S. PATENT DOCUMENTS 5,915,626 A * 6/1999 Awarzamani ........ F02M 31/125
                                                                  137/341
9,032,712 B2    5/2015 Hodgson et al.
(Continued)

FOREIGN PATENT DOCUMENTS

CN    101238275    8/2008
CN    101900019    12/2010
(Continued)

OTHER PUBLICATIONS

Office Action dated Jan. 25, 2017 which issued in the corresponding Chinese Patent Application No. 201480011431.6.

*Primary Examiner* — Patrick Maines
(74) *Attorney, Agent, or Firm* — Cozen O'Connor

(57) ABSTRACT

A method for starting operation of a device for providing a liquid additive, the device having at least one preheating element and at least one PTC heating element, includes: a) heating by the at least one preheating element; b) conducting heat from the at least one preheating element to the at least one PTC heating element such that a temperature of the at least one PTC heating element is raised; and c) heating by the at least one PTC heating element when the temperature of the PTC heating element has been raised.

6 Claims, 2 Drawing Sheets

(52) U.S. Cl.
CPC .... *F01N 2610/01* (2013.01); *F01N 2610/105* (2013.01); *F01N 2610/1486* (2013.01); *Y02T 10/24* (2013.01)

(58) Field of Classification Search
USPC ......... 60/273, 274, 285, 286, 295, 300, 303; 392/441, 444, 447, 448, 449
See application file for complete search history.

(56) References Cited

U.S. PATENT DOCUMENTS

| | | |
|---|---|---|
| 2006/0236679 A1 | 10/2006 | Meyer et al. |
| 2008/0213106 A1* | 9/2008 | Schmidt ............... F04B 11/0033 417/410.1 |
| 2009/0028533 A1* | 1/2009 | Starck ................. F01N 3/2066 392/451 |
| 2009/0078692 A1 | 3/2009 | Starck |
| 2010/0107615 A1* | 5/2010 | Chmielewski ........ F01N 3/2066 60/303 |
| 2011/0210836 A1 | 9/2011 | Baumeister |
| 2013/0269789 A1* | 10/2013 | Fromont ................ G05D 23/00 137/59 |
| 2013/0334077 A1* | 12/2013 | Van Schaftingen .. F01N 3/2066 206/216 |
| 2013/0340409 A1 | 12/2013 | Hodgson et al. |

FOREIGN PATENT DOCUMENTS

| | | |
|---|---|---|
| CN | 102209839 | 10/2011 |
| CN | 202544973 | 11/2012 |
| DE | 10341996 A1 | 3/2005 |
| DE | 102010042985 A1 | 5/2012 |
| DE | 102011012441 A1 | 8/2012 |
| EP | 2182190 A2 | 5/2010 |
| JP | 11308763 A | 4/1998 |
| WO | WO 2012/113669 | 8/2012 |

* cited by examiner

METHOD FOR STARTING THE OPERATION OF A DEVICE FOR PROVIDING A LIQUID ADDITIVE

CROSS-REFERENCE TO RELATED APPLICATIONS

This is a U.S. national stage of application No. PCT/EP2014/053617, filed on 25 Feb. 2014, which claims priority to the German Application No. DE 10 2013 102 101.8 filed 4 Mar. 2013, the content of both incorporated herein by reference.

BACKGROUND OF THE INVENTION

1. Field of the Invention

The invention relates to a method for starting the operation of a device for providing a liquid additive.

2. Related Art

Devices for providing a liquid additive are used, for example, in the automotive field for supplying a liquid additive to an exhaust-gas treatment device for purification of the exhaust gases of an internal combustion engine of the motor vehicle. Exhaust-gas treatment devices in which a liquid additive is used for the purification of exhaust gases are widely used. An exhaust-gas purification method particularly commonly implemented in such exhaust-gas treatment devices is the method of selective catalytic reduction (SCR method). In this method, nitrogen oxide compounds in the exhaust gas are reduced with the aid of a reducing agent. Here, ammonia is typically used as reducing agent. The exhaust-gas treatment device typically has an SCR catalytic converter on which the nitrogen oxide compounds in the exhaust gas are reduced with the aid of the ammonia. Ammonia is usually stored in motor vehicles not directly but rather in the form of a reducing agent precursor solution. The reducing agent precursor solution is a liquid additive. One reducing agent precursor solution that is particularly frequently used is urea-water solution. A 32.5% urea-water solution is available under the trade name AdBlue®.

Upon the start of operation of a device of said type, it is a problem that the liquid additives can freeze at low temperatures. The urea-water solution described above, for example, freezes at −11° C. Such low temperatures may be encountered in particular during a long standstill period of the motor vehicle. After a long standstill period, it may be the case that the liquid additive in the device has frozen completely. The device then initially cannot provide any liquid additive. It is known for devices for providing liquid additive to have a heating system for melting frozen liquid additive, such that a provision of liquid additive is possible promptly after a start of operation.

As heating devices for such devices, PTC (positive temperature coefficient) heating elements are proposed in particular. PTC heating elements are electrical heating elements heated by an electrical current flowing through them. They have the additional characteristic that the electrical resistance for the current increases with rising temperature. It is thus achieved that the electrical current automatically decreases at high temperatures. As a result of the decrease of the electrical current, the heating power also decreases. This provides automatic protection of a PTC heating element against overheating.

However, in the case of such devices being heated by PTC heating elements, it is a problem that there is overall only a limited available amount of current, which is defined by a maximum power of a current supply source, for the operation of the device. In particular during the start of operation (when a supply must be provided to a multiplicity of current consumers simultaneously), the amount of current may not be sufficient to correctly maintain all functions of the device. The current consumption of PTC heating elements during the start of operation is a particular problem.

SUMMARY OF THE INVENTION

Taking this as a starting point, it is therefore an object of the present invention to solve, or at least alleviate, the technical problems highlighted in connection with the prior art. It is sought in particular to propose a particularly advantageous method for starting the operation of a device for providing liquid additive and a correspondingly adapted and advantageous device for providing liquid additive.

Accordingly, in accordance with one aspect of the present invention, there is proposed a method for starting the operation of a device for providing a liquid additive, having at least one preheating element and at least one PTC heating element, having at least the following steps:

a) heating by the preheating element, b) conducting heat from the preheating element to the at least one PTC heating element such that a temperature of the at least one PTC heating element is raised, and c) heating by the at least one PTC heating element when the temperature of the at least one PTC heating element has been raised.

The liquid additive is, in particular, (as also specified above) a urea-water solution having a urea content of 32.5%. The implementation of the method is advantageous in particular if (predefined) cold start conditions are present upon the start of operation. Cold start conditions are present, for example, if the device is installed in a motor vehicle and the start of operation was preceded by a long standstill period at low ambient temperatures. Low ambient temperatures are, for example, temperatures below freezing (below 0° C.) and in particular ambient temperatures below −11° C. (the freezing temperature of ureawater solution). The cold start conditions may be detected (by a suitable sensor arrangement) and evaluated (by a suitable control unit). For example, step a) may first and/or only be initiated when the at least one predefined cold start condition (presently detected temperature≤predefined cold start temperature; state of the additive=at least partially frozen; time duration for low temperature≥predefined minimum cold phase; etc.) is fulfilled.

The PTC heating element is an electrical heat conductor, also referred to as a cold conductor. In the case of a PTC heating element, the electrical resistance is considerably lower at low temperatures than at higher temperatures. The electrical conductivity is thus considerably higher at low temperatures. This is therefore also the origin of the term "cold conductor". It is preferable for the electrical resistance to be approximately constant at low temperatures and to then rise sharply beyond a nominal temperature. Beyond an end temperature, the electrical resistance is then constant again at a high level.

A PTC heating element is preferably operated with a fixedly predefined heating voltage of for example 12 volts or 24 volts. Owing to the temperature dependency of the electrical resistance, the current flow through the PTC heating element automatically adapts in the case of a fixedly predefined heating voltage and rising temperature. The heating power of the PTC heating element thus also falls, such that further heating to higher temperatures no longer occurs. A PTC heating element is thus self-regulating in a relatively narrow temperature range. A PTC heating element for a device for providing liquid additive is preferably self-regulating in a narrowly defined temperature range. The temperature range of the at least one PTC heating element preferably lies between 10° C. and 80° C. Here, the stated temperatures 10° C. and 80° C. define a maximum upper limit and a minimum lower limit of the temperature range. In the case of suitable PTC heating elements, the temperature ranges lie, for example, between 20° C. and 30° C. or between 30° C. and 50° C. or between 50° C. and 60° C. Effective melting of frozen liquid additive is possible above approximately 10° C. Above approximately 80° C., there is the risk of chemical conversion of the liquid additive, such that temperatures above 80° C. should be avoided. Within the limits of 10° C. and 80° C., relatively high temperatures permit particularly fast thawing of frozen liquid additive, because at relatively high temperatures, the heat produced penetrates particularly quickly into the frozen liquid additive. Low temperatures permit a particularly uniform thawing of frozen liquid additive because, at low temperatures, lower local temperature peaks occur. At the same time, with low temperatures, energy losses during the thawing can be avoided.

The preheating element is preferably an electrical conductor with a simple linear dependency of the electrical resistance on the temperature. The temperature dependency of the electrical resistance is in particular linear in the range of temperatures encountered at the device. The range of encountered temperatures typically lies between −30° C. and 80° C. Here, −30° C. corresponds, for example, to particularly low ambient temperatures, and 80° C. corresponds to the maximum temperatures encountered during operation of the device, or to a maximum ambient temperature that may arise during a standstill period of a motor vehicle when the latter is subject to intense solar radiation.

In step a), the device is initially (only) heated by the (preferably one single) preheating element. For this purpose, the preheating element is acted on with a heating voltage that corresponds for example to approximately 12 volts or approximately 24 volts or to a voltage provided by the on-board electrical system of a motor vehicle. Owing to that heating voltage, an electrical current is generated that flows through the preheating element. The resistance of the preheating element is typically selected such that an available electrical power capacity of a current supply source of the device is sufficient to provide to the preheating element the electrical energy demanded by the preheating element.

In step b), the heat is conducted from the preheating element to the at least one (not yet activated) PTC heating element, such that the temperature of the PTC heating element is (noticeably and/or targetedly) raised. For this purpose, there may be provided between the preheating element and the PTC heating element at least one heat-conducting structure or a heat bridge that conducts the heat of the preheating element to the PTC heating element in a targeted manner. Furthermore, there may also be provided at least one convection conveyor, for example a fan, by which the waste heat of the preheating element is transferred to the PTC heating element.

Subsequently, in step c), the temperature of the device is raised further by the PTC heating element (on its own or together with the preheating element). It is preferable for the preheating element to be deactivated again, or at least for the heating power thereof to be reduced, during step c).

Method steps a) to c) preferably take place in the sequence a), b), c), wherein in particular method steps a) and b) may also take place at least partially in parallel. As a result of the start of the heating of the device by the preheating element, it is possible to prevent a situation in which, upon start-up, a particularly high heating current is demanded by the PTC heating element. In particular at temperatures far below the nominal temperature of the PTC heating element, the resistance of the PTC heating element is often so low that, without the described method steps a) and b), the amount of current required for the operation of the PTC heating element would be very large. It is thus possible for an overload of a current supply source of a device for providing liquid additive to be avoided.

At the same time, in the range of operating temperatures, particularly precise regulation of the temperature of the device is realized by the at least one PTC heating element because it is possible to use a particularly fast-reacting PTC heating element with a particularly narrow self-regulating temperature range and with a particularly large step in electrical resistance in the region of the nominal temperature. This is possible because the PTC heating element can, owing to the described method implementation, be configured independently of typical cold start conditions.

The method is particularly advantageous if, at low temperatures, the electrical resistance of the at least one preheating element is greater than the electrical resistance of the at least one PTC heating element.

In this context, the expression "low temperature" corresponds to temperatures that typically prevail under cold start conditions. These are for example temperatures below 0° C. or even temperatures below −11° C. Since the electrical resistance of the preheating element is greater at low temperatures than the electrical resistance of the at least one PTC heating element, the current consumption of the preheating element is lower at low temperatures than the current consumption of the PTC heating element.

The method is furthermore advantageous if the at least one preheating element is a drive coil of a pump for delivering the liquid additive in the device.

The pump for delivering the liquid additive in the device may be, for example, a diaphragm type pump or a piston pump. The pump preferably has an electric linear drive or an electric rotary drive. Such a drive typically has a drive coil, which is an electrical conductor with an electrical resistance. The drive coil can advantageously be utilized as a preheating element. For this purpose, it is preferable for the drive coil to be traversed by a current not high enough to generate a movement of the drive of the pump. The electrical current that flows through the drive coil is converted (primarily) into heat owing to the electrical resistance of the drive coil. When step c) is then, or has then been, initiated, the pump can continue to be operated with the normal operating current and commence the delivery. As a result of the use of the drive coil of a pump as a preheating element, it is possible in the device to dispense with additional components for realizing the described method. Furthermore, at low temperatures, the drive coil typically has an electrical resistance greater than the electrical resistance of the PTC heating element. The drive coil of a pump is therefore suitable as a preheating element for the described method.

The method is furthermore advantageous if, before step a), a reference temperature for the at least one PTC heating element is determined, and steps a) and b) are performed only when the reference temperature lies below a predefined threshold temperature.

The reference temperature for the at least one PTC heating element may, in particular, be a temperature of the PTC heating element itself. The reference temperature may, for example, be measured by a temperature sensor on the PTC heating element. It is however also possible for the reference temperature to be measured by a test voltage. A test voltage can be applied to the PTC heating element. The test voltage is preferably considerably lower than the heating voltage used for heating. The test voltage is, for example, less than 3 volts or even less than 1.5 volts. As a result of the low value of the test voltage, a large consumption of power by the PTC heating element when the test voltage is applied can be prevented. To determine the temperature, the electrical current that flows through the PTC heating element owing to the test voltage is then measured. From the electrical current, it is possible with the aid of a characteristic curve to determine a reference temperature for the at least one PTC heating element.

The predefined threshold temperature preferably corresponds to a temperature at which correct operation of the PTC heating element is possible. If the reference temperature of the PTC heating element corresponds to the predefined threshold temperature, the electrical resistance of the PTC heating element has already been increased in relation to cold start conditions. The electrical resistance is preferably already so high that the current consumption of the PTC heating element when the operating voltage is applied already lies in an admissible or intended range and can be supplied by a provided current supply source. The predefined threshold temperature lies for example between −10° C. and 20° C. The predefined threshold temperature is, for example, approximately 0° C.

By the determination of a reference temperature for the PTC heating element, it is possible to prevent steps a) and b) from being carried out when the reference temperature for the PTC heating element corresponds to or is even higher than the predefined threshold temperature and is thus already sufficient for correct operation of the PTC heating element. A cold start situation is then not present, and there is also no increased current consumption by the PTC heating element. It is thus possible for an unnecessary delay of the start of operation of a device for providing liquid additive to be avoided.

The method is furthermore advantageous if, before step c), a reference temperature for the at least one PTC heating element is determined, and wherein step c) is first initiated when the reference temperature for the PTC heating element is higher than a predefined minimum temperature.

The reference temperature used here preferably corresponds to the reference temperature specified above which can be determined before step a) for comparison with a threshold temperature.

The minimum temperature is typically a temperature at which correct operation of the PTC heating element is possible without an excessively high current consumption of the PTC heating element occurring. The minimum temperature may be, for example, the threshold temperature described further above. It is in particular also possible for the minimum temperature to be higher than the threshold temperature. This has the effect of hysteresis. A situation is avoided in which the preheating element is operated for very short time periods if the reference temperature lies in the region of the threshold temperature. It is also possible for the minimum temperature to be lower than the threshold temperature. The implementation of the described method then acts as an additional test that ensures that the reference temperature is actually sufficient for correct operation of the PTC heating element.

Also proposed is a device for providing a liquid additive, having at least one PTC heating element configured to melt frozen liquid additive in the device, and having at least one preheating element configured to preheat the at least one PTC heating element in a targeted manner.

The device is in particular suitable, and set up, for being activated in accordance with the method for the start of operation as described further above. The advantages and embodiment features specified in conjunction with the method can be transferred correspondingly to the proposed device. The same applies to the following advantages and embodiment features explained for the device described below, which can in the same way be applied and transferred to the described method.

The device is particularly advantageous if the preheating element is a drive coil of a pump for delivering the liquid additive in the device.

The device is furthermore advantageous if a heat-conducting structure is provided for conducting heat from the preheating element to the PTC heating element.

The heat-conducting structure may, for example, comprise at least one component from the following group: a heat-conducting plate, a heat-conducting block and a heat-pipe. A heat-conducting plate or a heat-conducting block may, for example, be formed with metal (in particular from copper or aluminum) and/or thermally conductive plastic. The heat-conducting structure may also be integrated into a housing of the device or into an assembly plate of the device. The thermally conductive structure is preferably arranged between the preheating element and the at least one PTC heating element so as to improve the thermal conductivity from the preheating element to the PTC heating element. The thermally conductive structure is preferably thermally insulated to the outside, such that the heat of the preheating element is conducted in a particularly targeted manner from the preheating element to the PTC heating element and the least possible amount of heat is lost into the environment around the heat-conducting structure and into the environment around the PTC heating element.

The device is furthermore advantageous if it forms an installation unit that can be inserted into a tank for liquid additive, wherein the at least one PTC heating element is configured to melt at least a starting volume of frozen liquid additive in the tank.

The installation unit preferably has a housing that can be inserted into a tank base of a tank for the liquid additive. The at least one PTC heating element is preferably designed to produce heat that can pass from the inside through the housing into the liquid additive at the outside in the tank. The starting volume is preferably a (limited) region of the entire tank volume, which region is arranged around the housing of the installation unit and can thereby particularly easily be reached by heat generated by the PTC heating element. The starting volume preferably corresponds to an amount of liquid additive typically required for a defined time period upon the start of operation of a device for providing liquid additive. For example, the starting volume may correspond to 200 ml [milliliters] and be sufficient for an operating time period of the device of approximately 20 min [minutes].

Tanks for storing liquid additive often have an additional heater. Here, "additional heater" refers to a heater in addition to the described preheating element and the described PTC heating element. Such a heater may, for example, be formed by a heating loop through which the cooling water of an internal combustion engine can flow. With such a heater, the liquid additive in the tank can be heated over a large area. The starting volume is preferably large enough to be able to provide liquid additive until an additional heater of this type has melted the liquid additive completely. A heating loop through which cooling water flows typically requires a significantly longer warm-up phase than a PTC heating element, because the temperature of the cooling water of an internal combustion engine initially rises only slowly after the start of operation.

The device, which is configured as an installation unit, preferably has a suction point at which liquid additive can be extracted from the tank. The suction point adjoins an interior space of the tank and in particular a starting volume within the interior space of the tank. Furthermore, the device, which is designed as an installation unit, preferably has a line connector to which a line for the liquid additive can be connected.

A filter may be arranged on the device, around the outside of the housing. Between the housing and the filter there is then a cylindrical cavity. The starting volume may correspond to the cylindrical cavity. The filter can be heated by the at least one PTC heating element.

The device is furthermore advantageous if it has a current supply source that can provide a maximum electrical power of less than 200 watts. The maximum electrical power of the current supply source is preferably between 72 watts and 144 watts. In the case of an available voltage of 12 volts, this corresponds to a maximum available current of between 6 amperes and 12 amperes. The at least one preheating element and the at least one PTC heating element are preferably designed such that the implementation of the described method is possible with a current supply source with the stated maximum electrical power.

Also proposed is a motor vehicle having an internal combustion engine, an exhaust-gas treatment device for purification of the exhaust gases of the internal combustion engine, and a described device for providing a liquid additive for the exhaust-gas treatment device.

In the exhaust-gas treatment device there is preferably arranged an SCR catalytic converter by which the method of selective catalytic reduction can be carried out. The described device is preferably connected to a line. The line leads to a metering device by which the liquid additive can be supplied to the exhaust-gas treatment device. The metering device preferably has, for this purpose, a nozzle that finely atomizes the liquid additive in the exhaust-gas treatment device (if appropriate with the aid of a pressurized medium such as air) and/or an injector by which the liquid additive can be dosed. The injector may for example be a valve that is opened and closed electrically.

BRIEF DESCRIPTION OF THE DRAWINGS

The invention and the technical field will be explained in more detail below on the basis of the figures. The figures show particularly preferred embodiments, to which the invention is however not restricted. It is pointed out in particular that the figures, and in particular the illustrated dimensional relationships, are merely schematic. In the figures.

DETAILED DESCRIPTION OF THE PRESENTLY PREFERRED EMBODIMENTS

Figure 1:
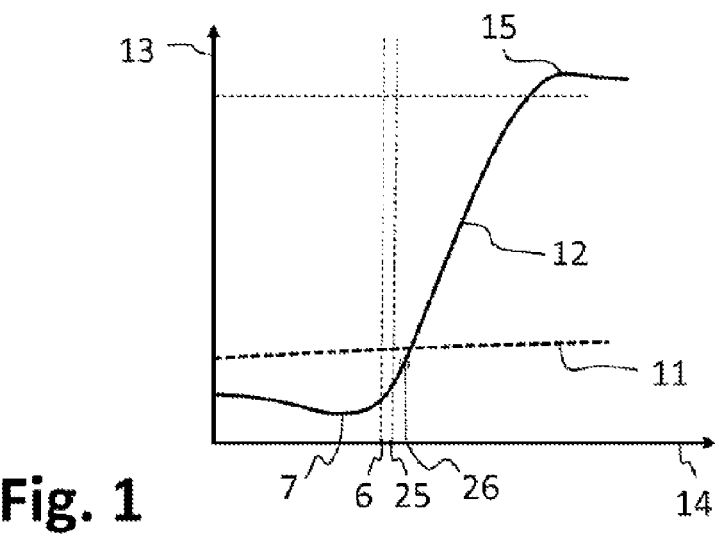
FIG. 1: shows a temperature-resistance diagram.

FIG. 1 illustrates the temperature dependencies of the electrical resistances of a preheating element and of a typical PTC heating element. The resistances are in each case plotted, versus the temperature axis 14, on the resistance axis 13. The PTC heater resistance 12 of the PTC heating element has an initial resistance 7 at low temperatures and begins to rise sharply at a nominal temperature 26. The PTC heating element is therefore self-regulating in a narrow temperature range around the nominal temperature 26. At temperatures above the nominal temperature 26, the PTC heater resistance 12 increases with temperature up to an end resistance 15. With further increasing temperature, the PTC heater resistance 12 does not increase any further, but rather is substantially constant. The PTC heater resistance 12 may even fall again slightly. A PTC heating element is however not normally operated in such a temperature range.

The preheater resistance 11 of a typical preheating element rises linearly only slowly with temperature, as can be seen in the diagram in FIG. 1.

Also plotted in the diagram is a threshold temperature 6. Method steps a) and b) are carried out only when a reference temperature of the PTC heating element is lower than this threshold temperature 6. When the reference temperature is higher than this threshold temperature 6, it is possible for the PTC heating element to be directly set in operation (step c) of the described method) such that a fast start of operation of the device can be realized. Likewise illustrated in FIG. 1 is a minimum temperature 25. When the reference temperature corresponds to the minimum temperature 25, the operation of the PTC heating element is started (step c) of the described method).

In FIG. 1, the threshold temperature 6 is lower than the minimum temperature 25. It is also possible for the threshold temperature 6 to be higher than the minimum temperature 25 or for the threshold temperature 6 and the minimum temperature 25 to correspond.

Figure 2:
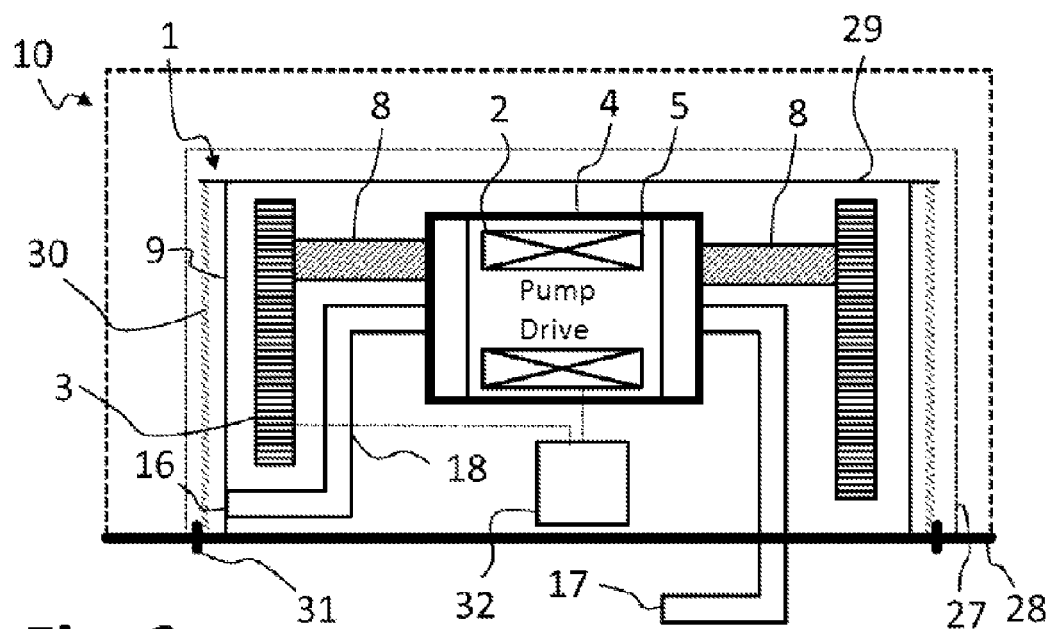
FIG. 2: shows a tank having a described device.

FIG. 2 shows a tank 10 into which a device 1, as an installation unit 9, has been placed. The device 1 has a housing 29 and is inserted into an opening 31 in the tank base 28 of the tank 10. The housing 29 preferably closes off the opening 31 in the tank base 28 in a fluid-tight manner.

The device 1 has a suction point 16 at which liquid additive (in particular urea-water solution) can be extracted from the tank 10. Furthermore, the device 1 has a line connector 17 to which a line for providing the liquid additive can be connected. A duct 18 runs through the device 1 from the suction point 16 to the line connector 17. In the duct 18 there is arranged a pump 4 by which the liquid additive can be delivered. The pump 4 has a drive coil 5 that drives the pump 4. The drive coil 5 of the pump 4 is used as a preheating element 2. The device 1 furthermore has a PTC heating element 3. The PTC heating element 3 is connected by a heat-conducting structure 8 to the drive coil 5 of the pump 4 or to the preheating element 2. A starting volume 27 of liquid additive is situated in the tank 10 around the device 1. The PTC heating element 3 is configured to heat liquid additive in the starting volume 27 through the housing 29 of the device 1. The PTC heating element 3 and the preheating element 2 or the pump 4 are supplied with electrical current by a current supply source 32 of the device 1. Around the outside of the housing 29 there is optionally also arranged a filter 30 that delimits the starting volume 27 and covers the suction point 16 such that the liquid additive, as it is extracted from the tank 10, is filtered by the filter 30.

Figure 3:
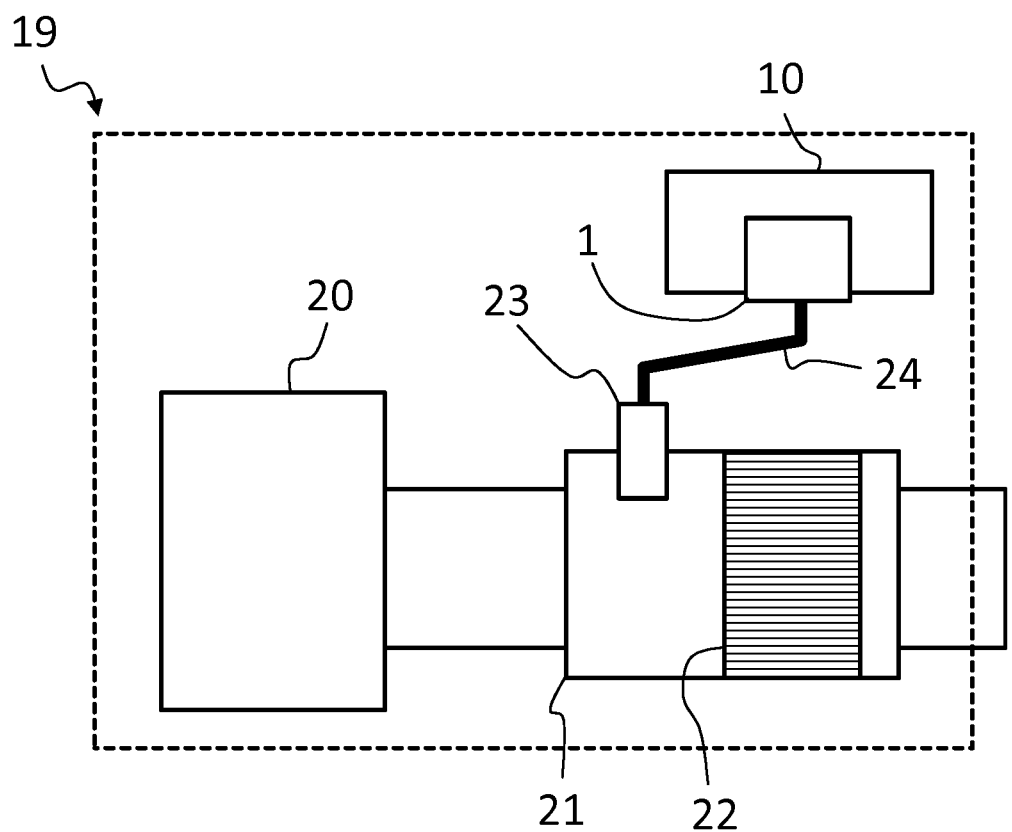
FIG. 3: shows a motor vehicle having a described device.

FIG. 3 shows a motor vehicle 19 having an internal combustion engine 20 and having an exhaust-gas treatment device 21 for the purification of the exhaust gases of the internal combustion engine 20. An SCR catalytic converter 22 is provided in the exhaust-gas treatment device 21. Provided on the exhaust-gas treatment device 21 is a metering device 23 by which the liquid additive can be supplied to the exhaust-gas treatment device 21. Liquid additive is supplied from a tank 10 to the metering device 23 via a line 24 by a device 1.

The invention permits particularly advantageous operation of a device for providing liquid additive. It is possible in particular to realize a reduction of the current required upon the start of operation by a device for providing liquid additive. Improved dimensioning and configuration of the device, and in particular of the current supply of the device, is made possible in this way.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for starting operation of a device for providing a liquid additive, the device having at least one preheating element including a drive coil of a pump having a pump drive configured to deliver the liquid additive to the device, at least one PTC heating element, and at least one heat conductor arranged between the at least one preheating element and the at least one PTC heating element, the at least one heat conductor being configured to conduct heat from the at least one preheating element to the at least one PTC heating element, the at least one heat conductor being thermally insulated on an outer surface thereof such that the heat of the at least one preheating element is conducted in a targeted manner to the at least one PTC heating element while minimizing heat loss into the environment around the PTC heating element, the method comprising:
    a) causing the preheating element to produce heat by application of a current below a threshold to generate movement of the pump drive;
    b) conducting by the at least one heat conductor heat from the at least one preheating element to the at least one PTC heating element such that a temperature of the at least one PTC heating element is raised; and
    c) heating by the at least one PTC heating element when the temperature of the PTC heating element has been raised and increasing the current to the at least one preheating element sufficiently to generate movement of the pump drive.

2. The method according to claim 1, wherein before step a), a reference temperature for the at least one PTC heating element is determined, and steps a) and b) are performed only when said reference temperature lies below a predefined threshold temperature.

3. The method according to claim 1, wherein, before step c), a reference temperature for the at least one PTC heating element is determined, and wherein step c) is first initiated when the reference temperature for the PTC heating element is higher than a predefined minimum temperature.

4. A device for providing a liquid additive, comprising:
    at least one PTC heating element configured to melt frozen liquid additive in the device;
    a preheating element configured to preheat the at least one PTC heating element, the preheating element comprising a drive coil of a pump having a pump drive configured to deliver the liquid additive in the device; and
    at least one heat conductor arranged between the preheating element and the at least one PTC heating element, the at least one heat conductor being configured to conduct heat from the preheating element to the at least one PTC heating element, the at least one heat conductor being thermally insulated on an outer surface thereof such that the heat of the preheating element is conducted in a targeted manner to the at least one PTC heating element while minimizing heat loss into the environment around the PTC heating element,
    wherein the preheating of the at least one PTC heating element is effected by: (a) causing the preheating element to produce heat by application of a current to the preheating element that is below a threshold to generate movement of the pump drive and (b) conducting by the at least one heat conductor the heat produced by the preheating element to the at least one PTC heating element, and
    wherein once the temperature of the PTC heating element has been raised by heat from the preheating element, the PTC heating element provides heat to melt the frozen liquid additive in the device and the current to the preheating element is increased sufficiently to generate movement of the pump drive.

5. The device according to claim 4, wherein the device forms an installation unit insertable into a tank for liquid additive, wherein the at least one PTC heating element is configured to melt at least a starting volume of frozen liquid additive in the tank.

6. A motor vehicle, comprising:
    an internal combustion engine;
    an exhaust-gas treatment device configured to purify exhaust gases of the internal combustion engine; and
    a device according to claim 4 configured to provide a liquid additive for the exhaust-gas treatment device.

* * * * *